(No Model.)
J. C. McDORMAN.
HARROW.
No. 281,095. Patented July 10, 1883.
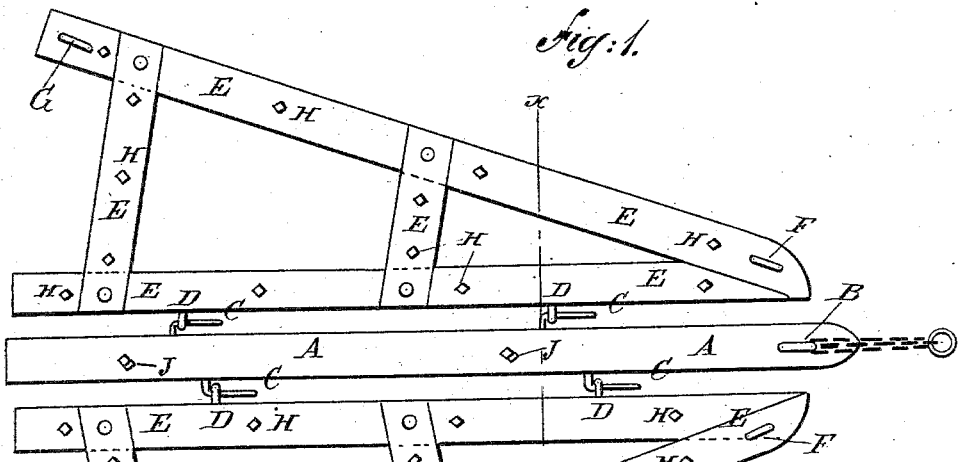
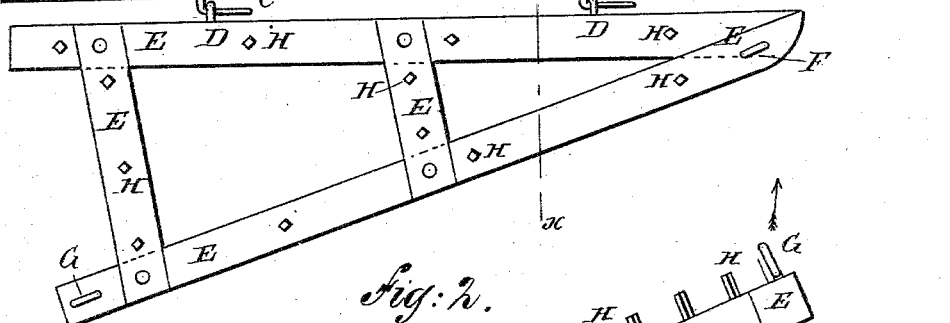
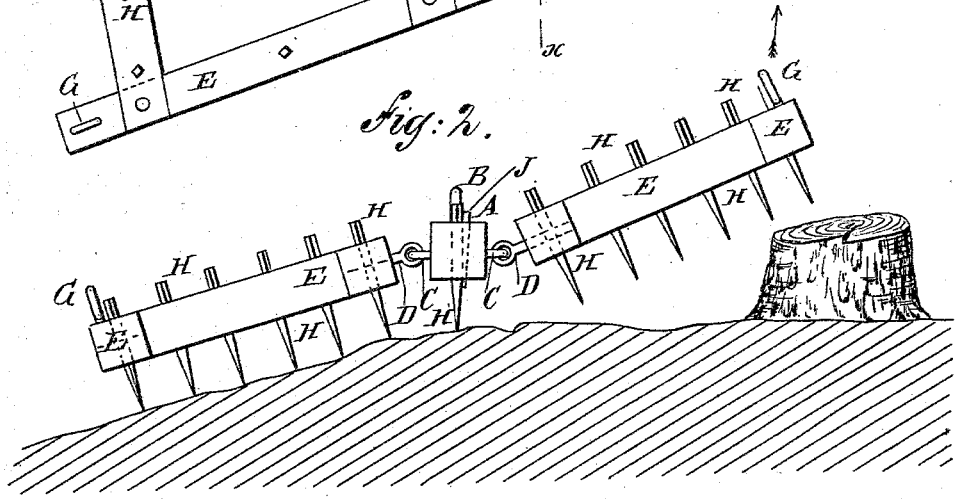
WITNESSES:
Chas. Nider
C. Sedgwick
INVENTOR:
J. C. McDorman
BY Munn & Co.
ATTORNEYS.
N. PETERS, Photo-Lithographer, Washington, D. C.

UNITED STATES PATENT OFFICE.

JOHN C. McDORMAN, OF GILBERT'S MILLS, OHIO.

HARROW.

SPECIFICATION forming part of Letters Patent No. 281,095, dated July 10, 1883.

Application filed April 4, 1883. (No model.)

*To all whom it may concern:*

Be it known that I, JOHN C. McDORMAN, of Gilbert's Mills, in the county of Paulding and State of Ohio, have invented a new and useful Improvement in Harrows, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a rear elevation of the same, illustrating its use. Fig. 3 is a sectional elevation of the same, taken through the line $x$ $x$, Fig. 1, and shown in position for being drawn from place to place.

My invention relates to improvements in harrows; and it consists in the peculiar construction and arrangement of the parts, as hereinafter more fully set forth, and pointed out in the claim.

A is the central beam of the harrow, to the forward end of which is attached a hook or eye, B, to receive the draft.

To each side of the beam A are attached two forwardly-projecting hooked pivots, C, upon which work the eyes of eyebolts D, attached to the inner side beams of the wings E. Each wing E is formed of two side beams, meeting at their forward ends at an acute angle and connected at their middle and rear parts by cross-beams, as shown in Fig. 1.

To the forward end of each wing E is attached a draft hook or eye, F, so that either wing can be used singly as a one-horse harrow, if desired.

To the rear end of the outer side beam of each wing E is attached a handle, G, for convenience in raising either wing while the harrow is in motion, to pass stumps, stones, and other obstructions.

To the center beam, A, and to the side and cross beams of the wings E, are attached the harrow-teeth H, as shown in Figs. 1, 2, and 3. With this construction the harrow can adjust itself to uneven or rolling ground, or to dead-furrows, so that all parts of the ground will be harrowed. With this construction, also, by raising the central beam, A, turning the wings E downward, and passing a cross-bar, I, through the spaces between the side beams of the said wings, as shown in Fig. 3, the harrow can be readily drawn from place to place, like a sled, without its being necessary to load the said harrow into a wagon.

By removing the teeth H from the central beam, A, the harrow can be drawn along a row of small plants, so as to loosen the soil and destroy the grass and weeds upon both sides of the row at one passage along it.

The teeth in the central beam can be secured in place by wedges J, so that they can be readily removed when required.

I am aware that two harrow-sections formed with runners on their outer edges and pivoted together by end cross-bars, so as to lie flat or edgewise, and provided with a transverse bar bent at its ends and adapted to lie inserted in holes in the harrow-sections when turned upright, so as to leave the field on runners formed of the harrow-sections, is old; and I am also aware that in a three-section harrow having its sections flexibly connected together, the combination with each outside section of a runner attached thereto at an angle of about forty-five degrees inclination toward the middle section, so that when the said sections are folded the said runners will assume a vertical position and support the entire harrow, is not new; and I am also aware that two sections of a harrow hinged together and provided with runners on its side edges, lifting-handles, grasping-jaws, sliding rings, and staples, and adapted to be reversed, so as to move on runners, is also old, and I therefore lay no claim to such constructions, my invention being confined to the precise construction and arrangement of parts shown.

Having thus fully described my invention, I claim as new and desire to secure by Letters Patent—

In a harrow, the combination, with the center beam, A, provided with the forwardly-projecting hooked pivots C, and the hinged triangular wings E, having eyebolts D, of the removable cross-bar I, substantially as described, and for the purpose set forth.

JOHN CALVEN McDORMAN.

Witnesses:
SAMUEL CAPRON,
ELIJAH KIRKPATRICK.